(12) United States Patent
Vandevoorde

(10) Patent No.: US 11,174,647 B2
(45) Date of Patent: Nov. 16, 2021

(54) METHOD FOR MANUFACTURING FLOOR PANELS

(71) Applicant: UNILIN, BVBA, Wielsbeke (BE)

(72) Inventor: Christof Vandevoorde, Zulte (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 17/038,938

(22) Filed: Sep. 30, 2020

(65) Prior Publication Data

US 2021/0010277 A1 Jan. 14, 2021

Related U.S. Application Data

(62) Division of application No. 15/763,458, filed as application No. PCT/IB2016/056410 on Oct. 25, 2016, now Pat. No. 10,829,942.

(Continued)

(30) Foreign Application Priority Data

Oct. 27, 2015 (BE) .................................. 2015/5691

(51) Int. Cl.
  *B32B 3/10* (2006.01)
  *E04F 15/10* (2006.01)
  *E04F 15/02* (2006.01)
  *B44C 5/04* (2006.01)
  *B32B 3/06* (2006.01)
  (Continued)

(52) U.S. Cl.
  CPC .............. *E04F 15/107* (2013.01); *B32B 3/06* (2013.01); *B32B 21/02* (2013.01); *B32B 27/28* (2013.01); *B32B 29/00* (2013.01); *B44C 5/0476* (2013.01); *E04F 15/02033* (2013.01); *E04F 15/102* (2013.01); *B32B 2419/00* (2013.01);
  (Continued)

(58) Field of Classification Search
  None
  See application file for complete search history.

(56) References Cited

U.S. PATENT DOCUMENTS

2011/0146188 A1 6/2011 Wallin
2013/0062006 A1* 3/2013 Meersseman ........... B32B 27/30
  156/245
2013/0104485 A1* 5/2013 Meersseman ............. B32B 3/06
  52/578

FOREIGN PATENT DOCUMENTS

BE 1019453 A3 7/2012
EP 1683929 A2 7/2006
(Continued)

OTHER PUBLICATIONS

International Search Report (ISR) dated Jan. 4, 2017, for PCT/IB2016/056410.

(Continued)

*Primary Examiner* — Christopher M Polley
(74) *Attorney, Agent, or Firm* — Workman Nydegger

(57) ABSTRACT

A method for manufacturing a floor panel with a substrate and a top layer of laminate, which floor panel, at one or more edges, is provided with a lower edge region, where the laminate extends in one piece from the actual upper surface of the substrate over the lower edge region at least up to a point. The laminate surface is situated at a level in a horizontal plane which intersects the substrate and that the substrate material, at the location of the lower edge region, has the same or a lower density than at the actual upper surface of the substrate material.

12 Claims, 8 Drawing Sheets

Related U.S. Application Data

(60) Provisional application No. 62/359,818, filed on Jul. 8, 2016.

(51) Int. Cl.
 *B32B 21/02* (2006.01)
 *B32B 27/28* (2006.01)
 *B32B 29/00* (2006.01)

(52) U.S. Cl.
 CPC . *E04F 15/02038* (2013.01); *E04F 2201/0146* (2013.01); *E04F 2201/0153* (2013.01)

(56) References Cited

FOREIGN PATENT DOCUMENTS

| | | |
|---|---|---|
| WO | 199747834 A1 | 12/1997 |
| WO | 200196688 A1 | 12/2001 |
| WO | 200196689 A1 | 12/2001 |
| WO | 2005051655 | 6/2005 |
| WO | 2006066776 A2 | 6/2006 |
| WO | 2007054812 A2 | 5/2007 |
| WO | 2010084466 A2 | 7/2010 |

OTHER PUBLICATIONS

Search Report on BE2015/5691.
Written Opinion of ISA dated Jan. 4, 2017, for PCT/IB2016/056410.

\* cited by examiner

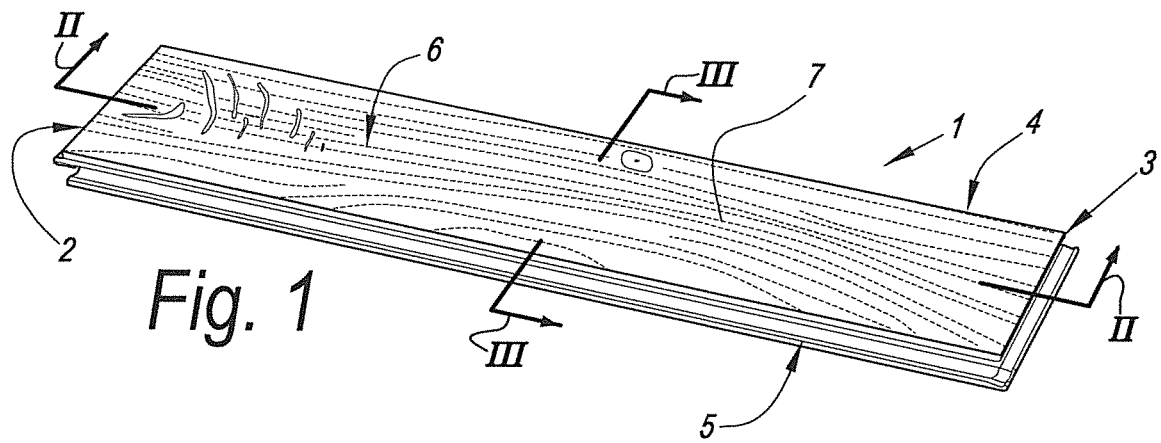

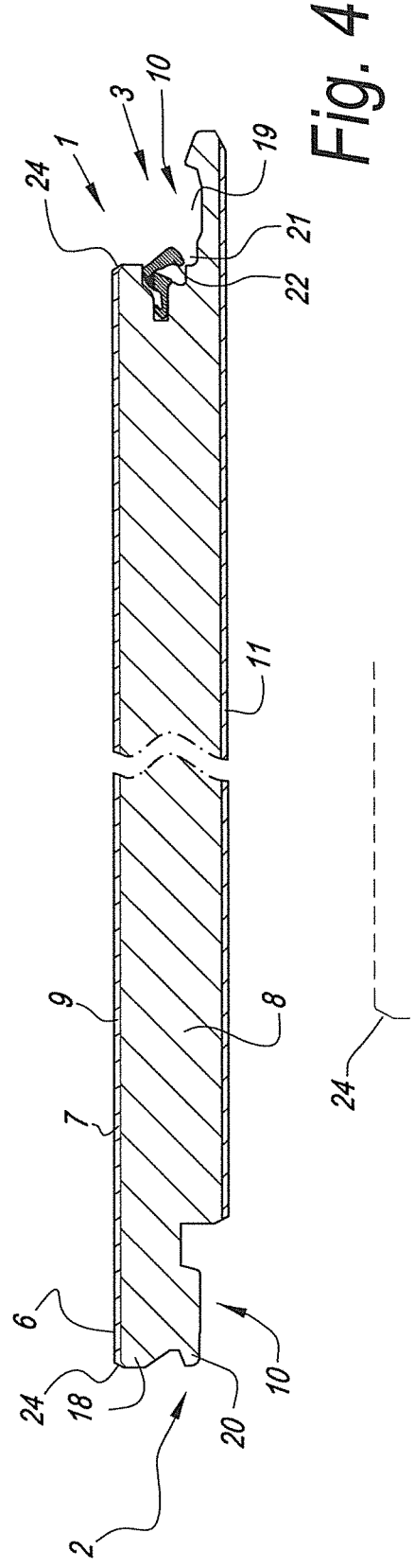
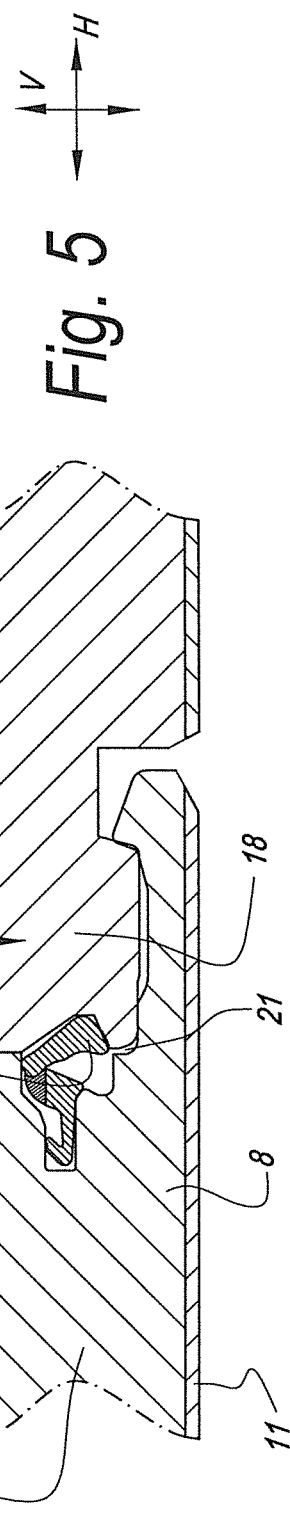

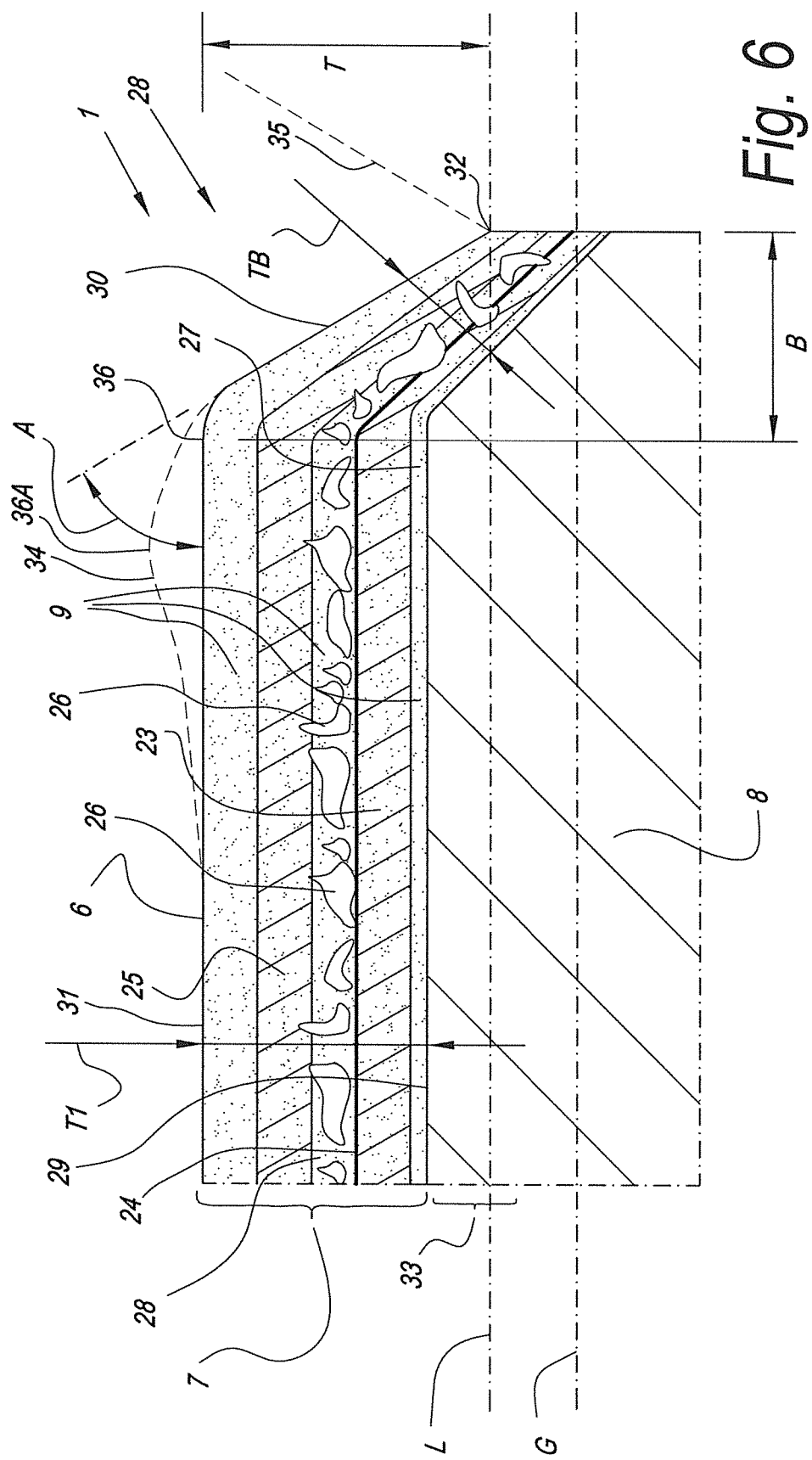

ns.The inventors have also found that the scratch and/or wear resistance at the laminate surface at the location of the lowered edge regions may be smaller than at the actual surface of the panel. It has been found that during the press treatment, possible hard particles, which are provided in the resin, have the tendency to migrate towards higher-situated regions, together with an amount of resin, such that the remaining laminate layer at the location of the lower-situated edge region will be less effective.
METHOD FOR MANUFACTURING FLOOR PANELS This invention relates to floor panels, as well as to a method for manufacturing such floor panels.

BACKGROUND OF THE INVENTION

More particularly, the invention relates to floor panels with a substrate and a top layer of laminate. Such floor panels are well-known as such, for example, from WO 97/47834. Herein, this may relate, for example, to floor panels with a substrate which substantially consists of an HDF board with a laminate layer directly pressed thereon, which layer comprises one or more paper sheets soaked in melamine resin, amongst which preferably also a paper sheet with a print in, for example, a wood or stone motif, namely a so-called decor paper.

In view of the fact that a melamine surface as such may impart a monotonous and sometimes plastic-like appearance to the panels, various possibilities are known in the state of the art in order to impart a more attractive appearance to this surface.

From WO 01/96689, WO 2006/063803, WO 2006/066776 and WO 2007/054812 it is known, for example, to provide the melamine surface with a wood structure which corresponds to the underlying wood motif print. Such structure interrupts the monotonous appearance of the panels.

From WO 01/96688, it is known to remove a material part from the edges of the floor panels in order to form an inclined portion. Herein, the surface of the inclined portion runs into the underlying HDF board and is provided with a separate decorative covering. Such inclined portions can realize a plank effect in the floor, wherein the adjacently installed panels will be more pronounced in the floor covering. However, the inclined portions of WO'688 are sensitive to water penetration via the inclined surface. Moreover, the separate covering of the inclined portions can show color differences in respect to the print of the laminate surface. By means of a digitally performed print at the inclined surface, WO 2007/054812 tries to offer a solution to this. WO 2006/063803 also represents lower edge regions in the form of a rectangular recess with horizontal bottom as an alternative for inclined portions.

From WO 2006/066776, it is known to provide lowered edge regions by means of embossments in the laminate surface, which continue into the substrate. The edge regions represented here extend from the laminate surface over a large distance towards the edge. They are rather somewhat rounded and cannot be considered inclined portions. When the laminate surface extends up to the edge of the floor panels, no undesired color differences are possible, and a better waterproofness of the panels can be assumed. As disclosed in WO'776, adjacent floor panels will not always perfectly adjoin at the height of such lowered edge regions, and at the location of such edge the substrate may become irritatingly visible at the upper surface. Then, special techniques can be applied in order to obtain better adjoining, such as providing an inclined portion at the respective edge by means of the technique of the above-mentioned WO 01/96688. Deforming the laminate surface and the underlying substrate material in accordance with WO'776 requires a particular control of the lamination process, special tools, to with press plates, and possible adaptations of the HDF material. Moreover, the inventors have found that the HDF material compressed at the location of the lower edge regions will experience a quality loss. This may express itself by a slightly standing upright or upward warping of the laminate edges and possibly the premature loosening of the laminate from the substrate material at the height of these edges, which is detrimental to the water-repellency and the wear resistance of the panels. Presumably, the connections among the wood fibers will break or be weakened by the extreme pressure exerted thereupon when forming the lower edge regions, and this will lead to the herein above-mentioned negative effects. Further, the inventors have also found that the scratch and/or wear resistance at the laminate surface at the location of the lowered edge regions may be smaller than at the actual surface of the panel. It has been found that during the press treatment, possible hard particles, which are provided in the resin, have the tendency to migrate towards higher-situated regions, together with an amount of resin, such that the remaining laminate layer at the location of the lower-situated edge region will be less effective.

From WO 2005/051655, it is known to form the surface of the substrate before the laminate layer is provided thereon. In this manner, a macrostructure, for example, for imitating cement joints or traces of wear, is obtained in the surface of the final panel. From BE 1019453, it is known to apply such technique for realizing inclined portions at the edge of the floor panels. Herein, the laminate surface extends onto the surface of the inclined portions. The inclined portions are shallow, and similar irritating effects between badly adjoining panels may occur as in WO 2006/066776.

SUMMARY OF THE INVENTION

The present invention primarily aims at offering an alternative floor panel, wherein a solution is offered to one or more of the problems with the state of the art panels.

To this aim, the invention, according to a first independent aspect, relates to a floor panel with a substrate and a top layer of laminate, wherein said floor panel, at one or more edges, is provided with a lower edge region in the form of a bevel or other chamfer, with the characteristic that said laminate extends in one piece from the actual upper surface of the substrate over the lower edge region at least up to a point wherein the laminate surface is at a level in a horizontal plane which intersects said substrate, and that the substrate material, at the location of the lower edge region, has approximately the same, the same or a lower density than at the actual upper surface of the substrate material. By means of the continuous laminate surface, an excellent color consistency between the lower edge region and the laminate at the actual upper surface can be obtained, and a water-tight layer is obtained at the lower edge region. As the lower edge region is made relatively deep, a possible deficient adjoining between adjacent floor panels in a floor covering is less irritating. Moreover, the absence of a significant density increase of the substrate material at the location of the lower edge region guarantees the quality of the substrate material at this edge.

Preferably, the aforementioned level is located at a depth of at least one millimeter, and preferably a depth of less than three millimeters, underneath the upper side, or the highest point, of the laminate surface situated at said actual upper surface of the substrate.

Independent of the actual depth of the aforementioned level underneath the upper side, or highest point, of the laminate at the actual upper surface, this depth, according to a preferred embodiment, is at least 60 percent of the horizontal distance, or width, over which the lower-situated edge region is extending, and still better 85 percent or more. Ideally, a ratio between the depth and the horizontal distance is obtained situated between 80 and 150 percent, wherein the aforementioned horizontal distance is determined starting from the point where the laminate surface starts lowering, up to the edge thereof. With the present preferred embodiment, a deep edge region is obtained, such that a possible bad adjoining or other irritating effects between adjacent panels are hardly observed.

Preferably, the level of the laminate surface continuously declines from the actual upper surface to the lower edge region. By this is meant that there are no intermediate regions where the laminate surface ascends. Excluding such regions in the proximity of the lowered edge region is of particular importance for the prevention of premature wear.

Preferably, the aforementioned lower edge region is realized with a sloped surface, for example, as an inclined portion which, globally seen, includes an angle with the actual upper surface of more than 30°, for example, of 35° to 60°, and preferably approximately 45°. Preferably, the opposite edge of the floor panel is also provided with such lower edge region, such that when adjoining to a similar panel, a V-groove is formed in the floor covering. Preferably, the sloped surface of the lower edge region extends up to the actual edge of the floor panel.

Of course, other types of lower edge regions are not excluded. So, for example, the lower edge region, in conjunction with an opposite edge region of a similar floor panel, can result in a rather rectangular recess or U-shaped groove in the floor covering, namely a groove with an approximately horizontal bottom. Herein, it is possible that each of the opposite edges forms a portion of the approximately horizontal bottom, or that one of the opposite edges forms the entire bottom, whereas the other edge is not provided with a lower edge region.

The lowered edge region may or may not be realized with a geometry varying along the edge concerned. According to a particular embodiment of such lowered edge region, at least the width thereof varies along the edge concerned. Such variation in width can take place over a substantial portion of the length of the edge concerned or can be rather local. The present invention allows such varying edge region in an excellent manner. Due to the relatively low density at the surface of the substrate material at the location of the lowered edge region, a limited deformation can be achieved in an efficient manner, for example by means of a press treatment performed at least at this edge region.

According to another particular embodiment, the laminate surface, at the location of the lowered edge region, also has a surface structure, for example, a wood structure or stone structure, as a function of the motif in the laminate. In the case of a wood structure, for example, a structure of wood pores can be applied, whether or not conform to the underlying wood print.

Preferably, the substrate substantially consists of an HDF board having an average density of more than 800 kilograms per cubic meter, wherein said HDF board forms at least the aforementioned actual upper surface of the substrate and the substrate surface at the location of the lower edge region. Preferably, this concerns an HDF board having at its both surfaces a locally higher density, so-called peak density, which is at least 110% of the average density. It is clear that in such case the HDF material situated more centrally seen in the thickness dimension has a density which is lower than the average density and, for example, has less than 90% of this average density. Preferably, said substrate at the actual substrate surface has a density of more than 900 kilograms per cubic meter. In the case of an HDF board with a peak density of at least 110% of the average density, the aforementioned lower edge region preferably extends deeper than the zone with said peak density, namely preferably into a zone having a density corresponding to the average density of the respective board or less.

Preferably, said laminate is formed on the basis of melamine resin or another thermosetting resin, and possibly one or more paper sheets. Preferably, the laminate comprises at least a paper sheet which is printed and provided with resin, and preferably a provided thereon paper sheet which is transparent or translucent and provided with resin.

Further, the laminate may comprise wear-resistant particles located above the print.

Preferably, the laminate is adhered to the substrate material without additional intermediate glue or resin layers, namely to the actual upper surface as well as at the location of the lower edge region. The laminate preferably concerns a laminate of the type DPL ("Direct Pressure Laminate"). The particularity of a DPL technique is that the laminate layer is formed by consolidating, by means of a press treatment, at least a decor paper and one or more layers of synthetic material, whether or not provided on the decor paper, for example, by means of an impregnation technique. Herein, the synthetic material concerns a thermally hardening material, such as melamine resin. Consolidating includes at least a hardening or cross-linking of the thermally hardening synthetic material. At the same moment, namely, by means of one and the same press treatment, this laminate layer is attached to the substrate. Within the scope of the present invention, then preferably an adherence is achieved on the actual upper surface of the substrate as well as on the surface of the lowered edge region, for example, on an inclined portion. In the most applied DPL panels, the laminate layer is composed of a printed decor paper, which is provided with a thermosetting resin, and a transparent layer provided thereon, which comprises thermosetting resin, also called overlay. At the lower side of the substrate material, during the same press treatment preferably also a resin layer is provided, for example, at least a paper sheet soaked in resin, which serves as a balancing layer for possible tensile stresses in the laminate layer at the upper surface, such that a stable pressed whole can be achieved.

As aforementioned, the floor panel, on at least two opposite edges, comprises such lower edge regions. Herein, the respective point up to which the laminate surface extends is located in both lower edge regions preferably on an equal horizontal level or practically equal horizontal level, wherein a possible difference in horizontal level is less than the thickness of the laminate. Hereby is achieved that the substrate material cannot become visible at the location of two adjoining floor panels. As the density of the substrate material at the location of the lowered edge region is approximately equal to, and preferably even is lower than, the substrate material at the actual upper surface, a more precise adjoining of adjacent floor panels can be obtained.

With the same aim as in the first aspect, the present invention, according to a second independent aspect, also relates to a method for manufacturing floor panels, wherein these floor panels comprise at least a substrate and a top layer of laminate and wherein said floor panel, at one or more edges, is provided with a lower edge region, for example, in the form of a bevel or other chamfer, wherein the method comprises at least the following steps:

the step of providing a basic board of the material of said substrate and structuring the upper surface of said basic board, wherein this structure consists at least of a recess in the upper surface of the basic board at the location of said lower edge region;

the step of composing a stack comprising at least the structured basic board and one or more melamine resin layers and possibly paper layers;

the step of pressing said stack in a heated press, wherein said melamine resin hardens and, together with the possible paper layers, forms a laminate layer adhered to the substrate, and wherein this laminate layer extends in one piece from the actual upper surface of the basic board into said recess, at least up to a point where the laminate surface is on a level in a horizontal plane intersecting said substrate;

the step of dividing the pressed whole into panels from which said floor panels can be formed;

the step of finishing said panels to said floor panels, wherein an edge of said recess forms said lower edge region.

The step of structuring the upper surface of the substrate material preferably is performed by means of one or more machining tools, for example, rotating tools, such as saws and/or milling tools. However, it is not excluded that, for obtaining the structure in the basic board, deformation treatments may be performed, such as press treatments by means of one or more press plates or press rolls. According to a particular possibility, the structure of the upper surface of the basic board is at least partially obtained by providing material selectively and/or varyingly, such as, for example, a mixture of wood particles and glue, such as melamine and/or urea formaldehyde resin, wherein the aforementioned one or more recesses then are formed at the locations where no or less material is provided. According to another example, one or more resin-soaked paper strips, or underlays, can be applied in order to achieve a local elevation of the surface, wherein the aforementioned recesses then are at least partially formed by the seams between said paper strips. Of course, it is not excluded to combine two or more of the herein above-mentioned possibilities of realizing a structure at the upper surface of the basic board.

According to the most preferred embodiment, the upper surface of the structured basic board consists integrally of the material of the basic board itself, such that, in other words, no material is added for forming the aforementioned structure.

Preferably, the method of the invention relates to an embodiment of the already above-mentioned DPL technique. In the known DPL technique, milk-like spots can appear in the melamine resin, and/or the scratch and/or wear resistance of the laminate surface leaves much to be desired. The present invention offers a remedy to this in the case of panels which have to be provided with lower edge regions. By preforming the basic board at the location of the lower-situated edge region, a possible density increase there is less large. Hereby, possible quality losses of the substrate material and/or the laminate layer at the edge become less relevant.

Preferably, one or more of said paper layers consist of paper strips situated next to each other, wherein said dividing then preferably takes place at least at the location of the edges of adjacent paper strips. This may relate, for example, to providing a decor paper and/or an overlay in strips. Working with separate paper strips reduces the risk of the occurrence of tears in particular in the proximity of the lowered edge region. Tears may occur in that the surface of the lowered edge region is significantly larger than an equivalent region with the same width which is not lowered. Certainly in those cases where the surface of the lower edge region is at least 125% of a region with the same width which is not lowered, providing separate paper strips is useful. So, for example, this is desirable with an inclined portion of approximately 45°, as the surface of such inclined portion is approximately 140% of an equivalent not impressed region. It can be expected that the paper strips, when performing the press treatment, will move away from each other, or, in other words, will show a larger mutual distance than this was the case in said stack before pressing. Hereby, possibly seams can become visible in the decor of the pressed whole. For this reason, it is useful to perform said dividing then preferably at least at the location of such seams.

According to a particular variant, one or more of the aforementioned paper layers, preferably at least the decor paper, extend in the stack continuously over the substrate material of two or more of the finally envisaged floor panels. Herein, the respective paper layer then of course also extends continuously over the zone located between the edges of the substrate material of these finally envisaged floor panels. The particularity of the present variant is characterized in that the press and/or the basic board is provided with means which concentrate the tearing of the respective paper layers in the aforementioned zone, for example, in said recess in the upper surface of the basic board. For the means mentioned herein there are various practical embodiment examples, some of which are listed below, without intending to be exhaustive.

According to a first practical embodiment example, a local protrusion is provided in said zone, preferably a protrusion which is provided in one piece in the material of the basic board and thus forms part of the aforementioned structure of the upper surface of the basic board. The protrusion preferably has a most protruding portion in the form of a corner point with an acute angle, for example, an angle of less than 30°, or even of less than 15°. This may concern, for example, a protrusion with a triangular distal portion, wherein one of the corner points forms a convex portion in the structure of the upper surface. The height of the protrusion preferably is approximately equal or equal to the depth of the aforementioned recess, and preferably the most protruding part thereof is situated approximately in said actual upper surface of the basic board. Preferably, the portion of the press element applied in the press, which portion is opposite to the protrusion, is made flat or substantially flat. The inventor has found that in this manner an easily controllable tear line can be obtained in the respective paper layers at the location of the protrusion. In the obtained pressed whole, the protrusion can be flattened without therein observing negative effects in the final panel product. As the protrusion is provided in the basic board, this is renewed in each pressing operation. In this manner, there will be no danger of becoming blunt, and the tearing of the respective paper layers can be controlled permanently. According to an alternative, of course a similar protrusion at the aforementioned press element can be used, which, however, then has the risk of becoming blunt prematurely. Preferably, in such case a cooperating therewith recess in the basic board is applied in order to avoid flattening of the protrusion at the press element as much as possible.

In the case of the first practical embodiment example, the aforementioned recess can extend over the entire zone between the edges of two finally envisaged floor panels, with the exception of said protrusion. Herein, the protrusion can be situated approximately halfway the aforementioned edges. In this manner, the risk of propagating of the tear line in the respective paper layer towards the surface of one or both of the floor panels is maximally limited.

According to a second practical embodiment example, the aforementioned means comprise at least a pair of cooperating, substantially vertical walls of the basic board, respectively the press element, which engage behind each other during the pressing step and in this manner punch the paper present in between. Here, too, there is a risk of the wall present at the press element becoming blunt, however, due to the cooperation with the permanently sharp wall present on the always renewed basic board the risk of premature uncontrolled tearing can be minimized.

It is noted that the inventive idea of applying the herein above-described means for concentrating tears in a so-called technical zone between two finally envisaged panels, for example, floor panels, can also be applied independently of the fact whether these floor panels comprise the lowered edge regions of the invention. Such tearing namely can also be of interest when other strongly structured laminate surfaces are to be achieved, or when an increased precision of the press treatment in general is to be achieved. Therefore, the invention, according to an independent particular aspect thereof, also relates to a method for manufacturing panels, wherein these panels have at least a substrate and a top layer on the basis of one or more material sheets, wherein the method comprises at least the following steps:

the step of providing a basic board of the material of the aforementioned substrate;
the step of composing a stack which comprises at least the basic board and one or more material sheets;
the step of pressing said stack in a heated press, wherein said one or more material sheets form a top layer adhered onto the substrate;
the step of subdividing the pressed whole into semi-finished panels, from which said panels can be formed;
the step of finishing the aforementioned semi-finished panels to form said floor panels;
characterized in that one or more of the aforementioned material sheets extend in the stack continuously over the substrate material of at least two of the finally envisaged panels and that the press element and/or the basic board are provided with one or more of the following means for concentrating tears in said material sheets in the zone extending between the edges of the substrate material of the aforementioned envisaged panels;
a local protrusion on the upper surface of the basic board in said zone;
a pair of cooperating, substantially vertical walls of the basic board, the press element, respectively, which during the step of pressing engage behind each other and punch the material sheet present in between them.

It is evident that said material sheets may concern melamine resin layers and possibly paper layers. However, this may also concern veneer layers, which possibly are pressed together with melamine resin layers. Preferably, this concerns finally obtained panels having a strongly structured surface, for example, with a final surface which comprises at least structural portions with a depth larger than the thickness of the top layer.

It is clear that in order to obtain sufficient scratch and/or wear resistance preferably one of the melamine resin layers comprises solid and/or hard particles, preferably hard particles, in a position wherein they are situated above the possible decor or print. Generally, herein this preferably concerns hard particles which are harder than the melamine resin in which they finally are situated in the panel. Preferably, this concerns ceramic particles, such as particles of aluminum oxide, silicon carbide or the like. Preferably, the particles have an average diameter situated between 20 and 200 micrometers, wherein an average diameter situated between 50 and 100 micrometers is preferred. When more than one, for example, at least two, of the melamine resin layers comprise solid and/or hard particles, this preferably concerns at least to two layers comprising hard particles of a same material, however, having preferably a different average diameter. So, for example, in a second layer, which preferably is situated closer to the laminate surface, particles with a smaller average diameter can be applied, for example, having an average diameter situated between 15 and 45 micrometers. The method of the invention has the advantage that the risk is limited that hard particles, which are present in the melamine resin destined for the lower edge region, will migrate towards higher-situated regions. In this manner, an excellent scratch and/or wear resistance can be obtained on the surface of the lower-situated edge region as well, or at least a resistance comparable to that of the actual upper surface.

As aforementioned, for the thermally hardening resin of the decor paper preferably a resin on the basis of melamine will be chosen, for example, melamine formaldehyde. Of course, the resin may comprise one or more additives. As additives, flow improvers, such as polyglycol ether, epsilon-caprolactam, ethylene glycol, phthalic acid, phthalic acid ester or butane diol, hardening agents, such as maleic acid, monobutyl phosphoric acid, p-toluene sulfonic acid, citric acid, a blend of one or more of these acids, aluminum sulfate, ammonium chloride or ammonium sulfate or other acids or salts, which in solution offer an acidic pH value, release agents and the like can be applied. A particularly useful additive is a fraction of an acrylic resin, a polyol, such as butane diol or polyurethane diol, a polyacrylate or another hydroxyfunctional acrylate. Such resin can be at least partially cross-linked or hardened, whereas still a sufficient processability of the decor paper or paper to be printed is maintained. This feature has shown useful to the inventors for performing the method of the invention with an improved repeatability. Working with hydroxyfunctional acrylate, or in other words an acrylate comprising a OH group, has the advantage that OH groups can be brought into the melamine in that the acrylate is soluble in melamine.

For example, use can be made of 30-75 parts by weight of liquid melamine formaldehyde resin with, for example, 15 to 45 percent by weight of solid matter, 5-10 parts by weight of a polyol or polyacrylate, and 2-3 parts by weight of flow improver.

It is noted that possibly at least one of the aforementioned one or more melamine resin layers are provided in the stack in a liquid manner, for example, while the decor paper is already situated on the substrate.

As aforementioned, preferably on the lower side of the substrate, too, one or more layers of synthetic material, preferably also a thermally hardening resin, are provided in order to form a vapor-tight and/or water-tight layer. These one or more layers lead to the creation of a balancing effect for compensating possible residual tensions in the top layer. For realizing such counter layer, use can be made of the techniques described in WO 2010/084466, wherein a paper-free balancing layer is obtained on the basis of polycondensating resin applied in liquid form. However, it is not excluded that for the counter layer or balancing layer use might be made of a carrier sheet provided with resin, such as a paper sheet, which is taken up into the stack to be pressed at the lower side of the substrate.

Preferably, in said step of pressing, apart from realizing the lower edge regions, preferably also a relief or surface structure is realized at least on the actual surface of the laminate panels. Preferably, the applied pressing pressure within the scope of the second aspect is less than 60 bar (6 MPa), or even less than 40 bar (4 MPa). The applied pressing temperature preferably is larger than 100° C. and may amount to 200° C. The required pressing temperature can be influenced by applying the also above-mentioned hardening catalysts or hardeners. By means of the above pressing parameters, a pressing time situated between 12 and 32 seconds may suffice; preferably, use can be made of a pressing time situated between 17 and 25 seconds.

Independent of the presence of a relief or surface structure at the actual surface of the laminate panels, it is possible that during said step of pressing a relief or surface structure is realized in the surface at the location of said lowered edge regions, for example, for obtaining a geometry of the edge region concerned which varies somewhat along the edge.

According to a variant, all aspects of the invention can also be applied in other laminate panels than floor panels. Actually, this may concern, for example, floor panels, ceiling panels, wall panels or furniture panels.

According to all aspects and deviating variants, the press treatment from the step of pressing preferably concerns a press treatment by means of an opening and closing press, namely, a so-called Kurztaktpresse or Single-Daylight press. Herein, preferably a press element is applied in the form of a structured press plate. During said press treatment, the structure of the press plate is copied in the surface of the laminate panels. For examples of possible press plates, reference is made to the already above-mentioned WO 2006/066776.

As aforementioned, the floor panel of the invention, or more particularly the lowered edge region, according to all aspects may show a varying geometry in the longitudinal direction of the edge concerned. Herein, this may concern a rather local deviation of a geometry which for the rest is substantially constant, or to a variation substantially extending over the entire length of the lowered edge region. In both cases, the upper surface of the substrate material preferably is provided with a constant structure, whereas the aforementioned variations of the geometry of the finally obtained lowered edge region preferably is obtained with the pressing of the stack, namely, for example, by means of a structured press element or press plate used therewith. Of course, it is also possible to provide the variation in geometry already to a certain extent in the structured basic board, either by means of a machining treatment, such as milling, or by means of deformation, such as by pressing the surface of the basic board.

It is clear that within the scope of the present invention, by thermally hardening is meant that the respective material hardens irreversibly with heat supply, this contrary to thermoplastic materials, which allow melting. Preferably, for the thermally hardening material, a material is applied which hardens by polycondensation. Instead of melamine-based resin, for the polycondensating material also urea or melamine-urea-based resin can be applied, such as urea formaldehyde or melamine urea formaldehyde.

Preferably, according to all aspects of the invention, finally in the top layer of the panel an amount of thermally hardening material is applied which preferably is situated between 30 and 200 grams per square meter, and still better is situated between 50 and 150 grams per square meter of dry weight. For a possible counter layer or balancing layer, the same limits may be applied, which does not necessarily have to lead to an amount of resin which is equally large. Preferably, the amount of resin in the balancing layer deviates at most 20 percent from the amount of resin in the top layer.

BRIEF DESCRIPTION OF THE DRAWINGS

With the intention of better showing the characteristics of the invention, herein below, as an example without any limitative character, some preferred embodiments are described, with reference to the accompanying drawings, wherein:

FIG. 1 in perspective represents a floor panel with the characteristics of the invention;

FIGS. 2 and 3, at a larger scale, represent a cross-section according to the lines II-II and III-III, respectively, represented in FIG. 1;

FIG. 4, in a view similar to that of FIG. 2, represents a variant;

FIG. 5, at a larger scale, represents the floor panel of FIG. 4 in coupled condition;

FIG. 6, at a larger scale, represents a view of the area indicated by F6 in FIG. 2.

DETAILED DESCRIPTION OF THE INVENTION

Figure 7:
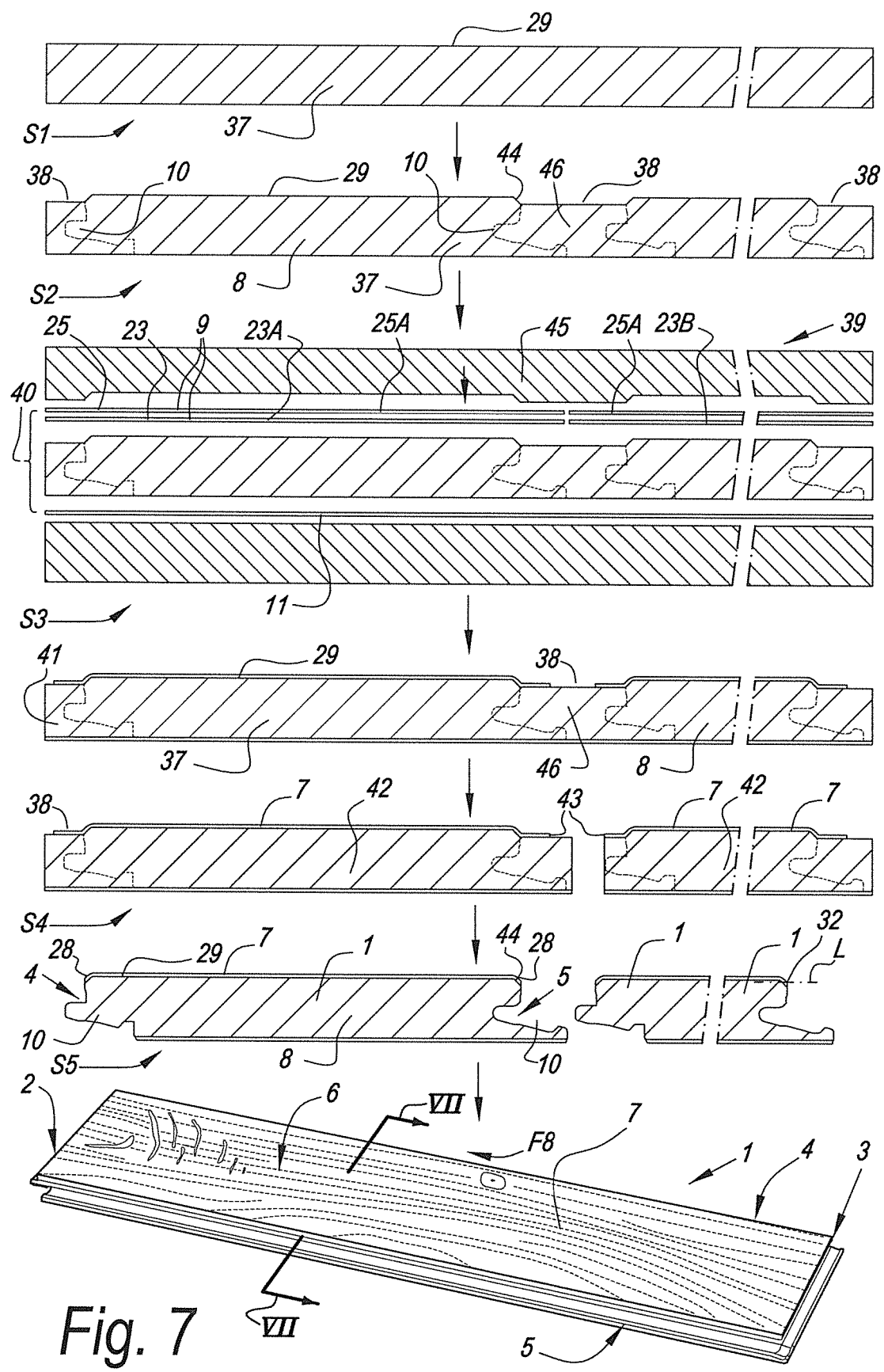
FIG. 7 schematically represents some steps in a method according to the second aspect of the invention.

FIG. 1 represents a decorative panel, more particularly a floor panel 1, in accordance with the invention. The panel 1 is rectangular and oblong and comprises a pair of opposite short edges 2-3 and a pair of opposite long edges 4-5. The decorative top layer 6 is formed by a laminate 7.

FIG. 2 clearly shows that the decorative panel 1 comprises a substrate 8 on which the laminate 7 is provided, in this case by means of a DPL technique without additional resin or glue layers. To this aim, the laminate 7 is formed on the basis of a thermosetting resin, namely, melamine resin 9. In the example, the substrate material 8 has an average density of more than 800 kilograms per cubic meter. In this case, this concerns an HDF board material having an average density of 900 kilograms per square meter and a surface density or peak density of more than 1000 kilograms per square meter. At the edges 2-3 and 4-5, mechanical coupling means 10 are formed in the substrate material by means of milling. At the lower side of the substrate material 8, a backing layer 11 is provided by means of the same DPL technique.

FIGS. 2 and 3 represent that both pairs of opposite edges 2-3-4-5 are provided with mechanical coupling means 10, which substantially are realized as a tongue 12 and a groove 13 bordered by an upper lip 14 and a lower lip 15, wherein the tongue 12 and the groove 12 substantially are responsible for the locking in a vertical direction V, and wherein the tongue 12 and the groove 13 are provided with additional locking parts 16-17, which substantially are responsible for the locking in a horizontal direction H. Preferably, the locking parts comprise a protrusion 16 at the lower side of the tongue 12 and a recess 17 in the lower groove lip 15. The coupling means 10 represented in FIGS. 2 and 3 allow at least a coupling by means of a rotational movement W around the respective edges 2-3-4-5 and/or a coupling by means of a shifting movement S, in a substantially horizontal manner, of the edges 2-3-4-5 to be coupled towards each other.

FIGS. 4 and 5 represent a variant with a pair of short edges 2-3, which allow obtaining a coupling at least by means of a downward movement D. One edge 2 is provided with a male coupling part 18, whereas the other edge 3 is provided with a female coupling part 19. By means of the downward movement D, the male coupling part 18 is pressed into the female coupling part 19 in order to be locked there in the vertical direction V, as a result of a pair of protrusions 20 and recesses 21 working in conjunction. In this case, the recess 21 partially is formed by a resilient element 22 present in the female coupling part 19.

FIG. 6 represents a detail of the upper edge of the floor panel from FIG. 2 and clearly shows that the laminate 7 is formed of a paper sheet soaked in resin 9, with a print 24, namely, a so-called decor paper 23, and a situated thereon transparent or translucent paper sheet soaked in resin 9, namely, a so-called overlay 25. The laminate 7 further also comprises wear-resistant particles 26, in this case corundum particles or Al2O3 particles, at a position where they are situated substantially above the print 24. The hard particles 26 concerned preferably are applied by means of the overlay 25, more particularly by means of the resin 9 situated at the lower side of the overlay 25.

It is noted that for clearness' sake, the mutual thicknesses of the paper sheets and intermediate resin layers are represented only schematically. So, for example, the resin layer 27 between the lower side of the decor paper 23 and the substrate 8 in practice shall be hardly visible, and the decor paper does contact or almost contact the substrate 8. Here, in the example this namely concerns a resin layer 27 which is provided by means of the decor paper 23 and provides for the connection to the substrate 8. During the press treatment forming the DPL laminate 7, this resin substantially penetrates into the substrate material 8. Concerning the resin layer 28 between the overlay 25 and the decor paper 23, it is noted that this layer partially is provided via the overlay 25 and partially via the decor paper 23.

According to the invention, the floor panel of FIGS. 1 to 6, at one or more edges 2-3-4-5, is provided with a lower edge region 28, wherein the laminate 7 extends in one piece from the actual upper surface 29 of the substrate 8 over this lower edge region 28. In the example, the lower edge regions 28 are realized as a bevel or inclined portion 30, which in this case encloses an angle A of approximately 60° with the upper surface 31. The laminate 7 extends over the lower edge region 28 at least to a point 32 wherein the laminate surface is situated at a level L in a horizontal plane which intersects the aforementioned substrate 8. At the location of the lower edge regions 28, the laminate 7 on average may have a thickness TB which is smaller than the global thickness T1 of the laminate 7. This difference in thickness then is obtained in that the laminate 7 is more compressed or impressed at these edges, however, this does not necessarily have to be so. The laminate 7 at the edge region 28 may have also approximately the same thickness TB as the laminate 7 at the actual upper surface 29. Preferably, the average thickness TB of the laminate at the lower edge regions is between 85% and 115% of the global thickness T1 of the laminate 7 at the actual upper surface 29 of the substrate 8.

At the location of the lowered edge region 28, the substrate material 8 is almost not or not compressed, such that the substrate material 8 there has the same or a lower density than at the actual upper surface 29. In this case, the laminate 7 extends up to a portion of substrate material 8 underneath the zone 33 with the peak density, namely, up to underneath the level G, where the density of the substrate material 8 corresponds to the average density.

FIG. 6 further represents that the laminate 7, without additional resin layers or glue layers, is directly attached to the substrate 8, namely, to the actual upper surface 29 as well as at the location of the lower edge region 28. The aforementioned hard particles 26 are present at the location of the actual upper surface 29, as well as at the location of the lower edge region 28, and in this case even in approximately the same concentration.

The level of the laminate surface 31 continuously diminishes from the actual upper surface 29 of the substrate 8 up to the lower edge region 28 and, in this case, even up the aforementioned point 32 at the edge of the floor panel 1. In dashed line 34, a less desirable situation is represented wherein this is not the case and wherein next to the lower edge region 28 an elevation is present. Such effect will occur when one wants to form the lower edge region by compressing the substrate material 8. In such case namely a portion of the substrate material 8 is pushed away towards the internal edge of the lowered edge region 28. In this manner, an elevation is formed on the surface of the substrate material 8, which then continues towards the laminate surface 31.

FIG. 6 further also shows, by dashed line 35, that the floor panels from FIGS. 1 to 6 shows such lower edge regions 28 on at least two opposite edges, wherein the respective point 32, up to where the laminate surface 31 is extending, in both lower edge regions 28 is situated at an equal horizontal level L. Adjoining both inclined portions or lower edge regions 28 here results in a so-called V-groove in the floor surface.

The depth T over width B ratio of the lower edge region 28 is between 80 and 150 percent and in this case is approximately 137 percent. Herein, the width B is determined starting from the point 36-36A, where the laminate surface 31 starts lowering, onto the edge of the lowered edge region 28, namely, in this case to the point 32.

FIG. 7 schematically represents some steps in a method for manufacturing laminate floor panels 1 having a lowered edge region 28. Herein, this relates to a method comprising at least the following steps:

the step S1 of providing a basic board 37 of the material of the substrate 8;

the step S2 of structuring the upper surface 29 of said basic board 37, wherein this structure consists at least of a recess 38 in the surface 29 of the basic board 37 at the location of said lower edge region 28. The recesses 38 may be provided, for example, by means of a sawing and/or milling device, for example, a sawing device with a plurality of parallel positioned rotating saws, wherein each saw preferably forms one of the aforementioned recesses. Such device is not represented here. This can be in-line with the press device 39 of the following step S3, or possibly off-line;

the step S3 of composing and pressing a stack 40 which comprises at least the structured basic board 37 and one or more melamine resin layers and possibly paper layers. In this case, the stack 40 at the top comprises two paper sheets soaked in melamine resin, namely, a decor paper 23 and an overlay 25. At the bottom, the stack 40 also comprises a paper sheet soaked in resin, which finally has to serve as the balancing layer 11. In the example, both the decor paper 23 and the overlay 25 comprise a plurality of adjacently situated paper strips 23A-23B; 25A-25B, namely, in this case, one paper strip 23A-23B per adjacently situated final floor panel 1. However, it is not excluded that one paper strip per two or more of adjacently situated final floor panels 1 may be applied. The pressing is performed in a heated press device 39. During pressing, the melamine resin 9 hardens, and the resin, together with the decor paper 23 and the overlay 25, forms a laminate layer 7 adhered directly onto the substrate 8. This laminate 7 extends in one piece from the actual upper surface 29 of the basic board 37 up to into said recess 38, at least up to a point 32, wherein the laminate surface 31 is situated at a level L in a horizontal plane intersecting the basic board 37 or the final substrate 8;

the step S4 of subdividing the pressed whole 41 into panels 42, of which said floor panels 1 can be formed. In this case, this subdividing takes place at the location of the edges 43 of the adjacent paper strips 23A-23B. It can be advantageous to saw as little as possible through the pressed laminate 7 in order to limit the wear of the sawing device. Preferably, there will be no sawing through the pressed laminate 7;

the step S5 of finishing the aforementioned panels 42 to form said floor panels 1, wherein an edge 44 of said recess 38 forms the substrate material 8 at the location of the lower edge region 28.

It is clear that the method illustrated by means of FIG. 7 can be applied for realizing the floor panels from FIG. 1 to 6, or more in general for realizing the floor panels of the first aspect of the invention. For clarity's sake, in FIG. 7 the shape of the final coupling means 10 is indicated in dashed line.

Further, it is clear that the view represented in FIG. 7 relates to a cross-section across the basic board 37, namely in a direction perpendicular to the length of the final floor panels, to with in the direction VII-VII indicated below in that figure. It is possible that, seen in longitudinal direction, a plurality of floor panels are successively taken from the pressed whole 41. The paper strips 23A-23B-25A-25B possibly may be continuous over the length of two or more floor panels 1 situated one after the other in the basic board.

Preferably, the decor paper 23 and/or the overlay 25 is divided into paper strips in-line with the press device 39 and/or by means of a laser device.

Preferably, the decor paper 23 and/or the overlay 25 is subdivided only when it is already situated on the basic board 37 and possibly is oriented in accordance with the structured press element 45. In this manner, the dividing of the decor paper and/or the overlay can be performed in a very stable and repeatable manner. Possibly, the decor paper and possibly the overlay, before or after being divided, can be locally adhered to the basic board 37 in order to avoid the risk of shifting or other hindrances when providing the stack 40 in the press device 39. Such adhering can be performed, for example, by locally, for example, in the form of points, hardening the resin 9, such that at the respective places an adherence to the basic board is realized already. Such adherence preferably is performed on the material 46 of the basic board which is intended for removal prior to dividing or to forming of the coupling parts 10.

Figure 8:
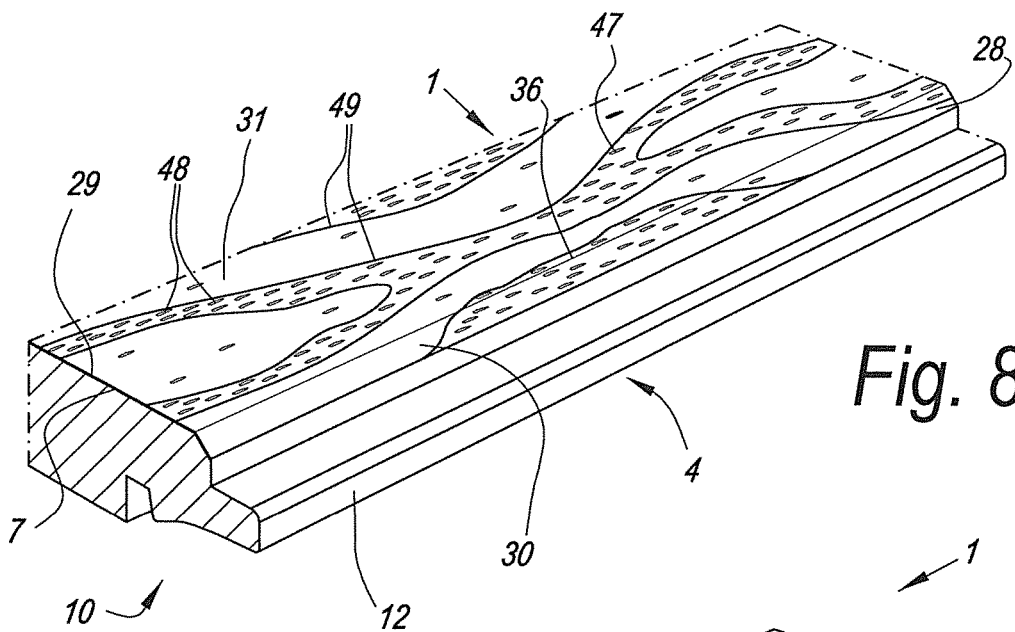
FIG. 8, at a larger scale, represents a view according to the arrow F8 represented in FIG. 7.

FIG. 8 represents an example, wherein the laminate surface 31 on the actual upper surface 29 of the substrate, as well as the laminate surface 30 on the lowered edge region is provided with a wood structure 47, which corresponds to the wood print of the laminate 7. The wood structure 47 is composed of impressions 48 which imitate wood pores and follow the course of the printed wood nerves 49.

Figure 9:
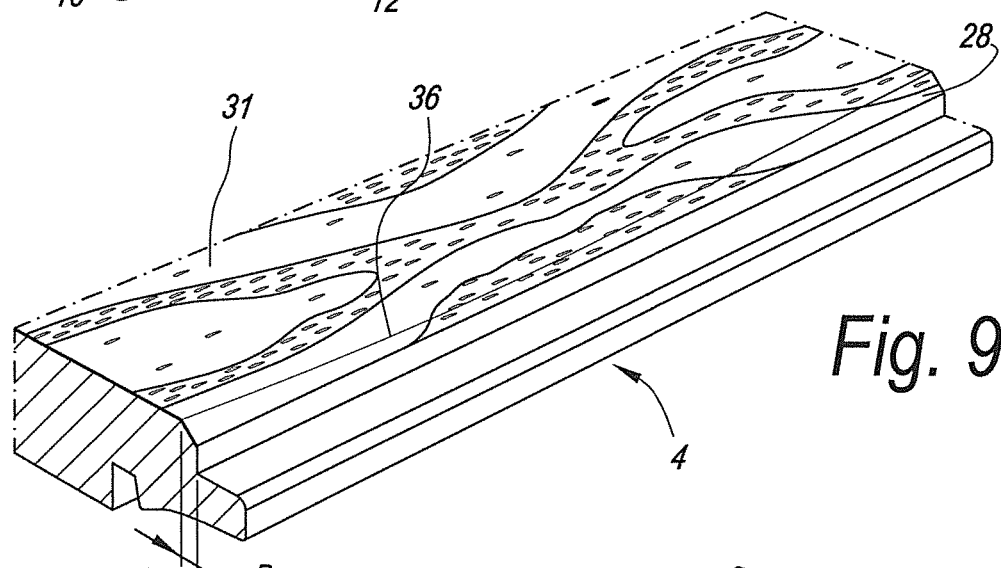
FIGS. 9 and 10, in a similar view, represent variants.

FIG. 9 represents a variant, wherein the geometry, more particularly the width B, of the lower edge region 28 varies along the edge 4. In this case, this concerns a variant which substantially extends along the entire length of the edge 4. Preferably, the geometry varies over at least 30 percent of the length of the edge 4.

Figure 10:
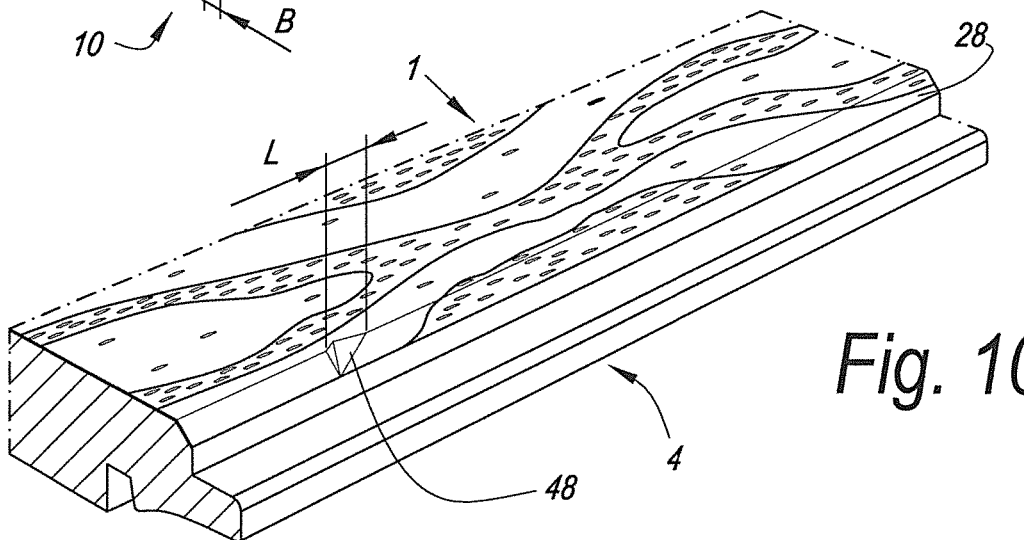

FIG. 10 represents a variant, wherein a local deviation 48 of an otherwise rather constant geometry of the lowered edge region 28 is applied. In this case, the deviation extends over a length L which is smaller than five times the width B of the lowered edge region 28, and here even is situated between one and two times the width B. It is evident that a plurality of such local deviations 48 can be present along the respective edge 4.

Figure 11:
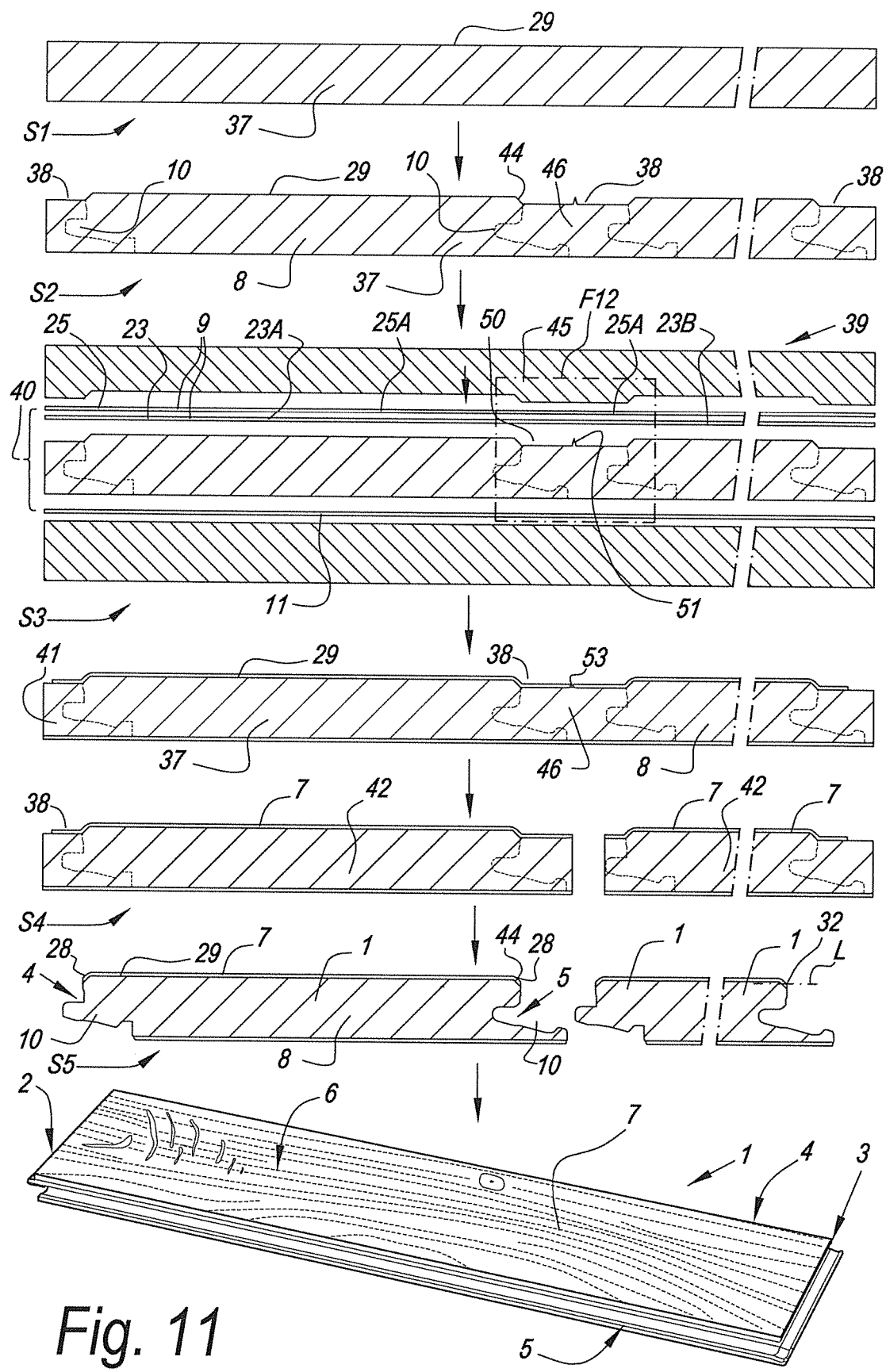
FIG. 11, in a view similar to that of FIG. 7, represents a variant of the method.

FIG. 11 represents another example of a method with the characteristics of the present invention, wherein at least the decor paper 23, however, in this case also the overlay 25, extend in the stack 40 uninterruptedly over the substrate material 8 of two or more of the finally envisaged floor panels 1 or panels 42.

Figure 12:
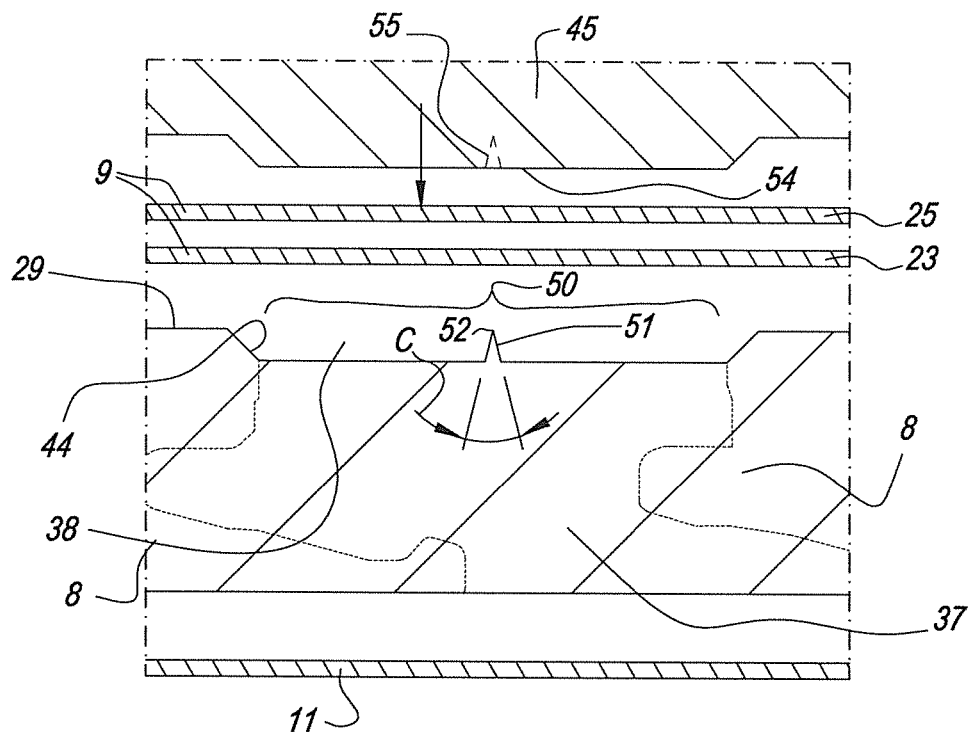
FIG. 12, at a larger scale, represents a view on the area indicated by F12 in FIG. 11.

FIG. 12 clearly shows that at least the decor paper 23 and here the overlay 25, too, also extend uninterruptedly over the zone 50 situated between the edges of the substrate material 8 of the final floor panels 1, and here more particularly between the edges 44 of the recess 38 at the location of the final lowered edge regions 28.

In the example of FIGS. 11 and 12 the aforementioned basic board 37 is provided with a local protrusion 51 in said zone 50. FIG. 12 thus shows an example of the first practical embodiment example, mentioned in the introduction, of means which concentrate the tearing of the respective paper layers 23-25 in the zone 50. In this example, the protrusion 51 is situated approximately halfway between the edges 44 and is made in one piece in the same material as the basic board 37. The protrusion 51 comprises a most protruding portion with an acute angle C of less than 30°. Herein, this protruding portion forms a convex portion in the structure of the upper surface 29 of the basic board 37. The corner point 52 herein is situated in the same plane, or approximately in the same plane, as the upper surface 29 of the basic board 37. Herein, the height of the protrusion 51 is approximately equal to the depth of the recess 38, which extends over the entire zone 50, with the exception of the respective protrusion 50.

FIG. 11 represents that after pressing a tear line 53 is showing at the location of the aforementioned protrusion 51. The protrusion 51 is flattened, however, does not lead to negative effects for the surface of the final floor panels 1.

FIGS. 11 and 12 represent that the portion 54 of the press element 45 opposite to the protrusion 51 is substantially made flat. According to an alternative, represented in dashed line 55, a recess working in conjunction with the protrusion 51 can be provided in the press element 45.

Figure 13:
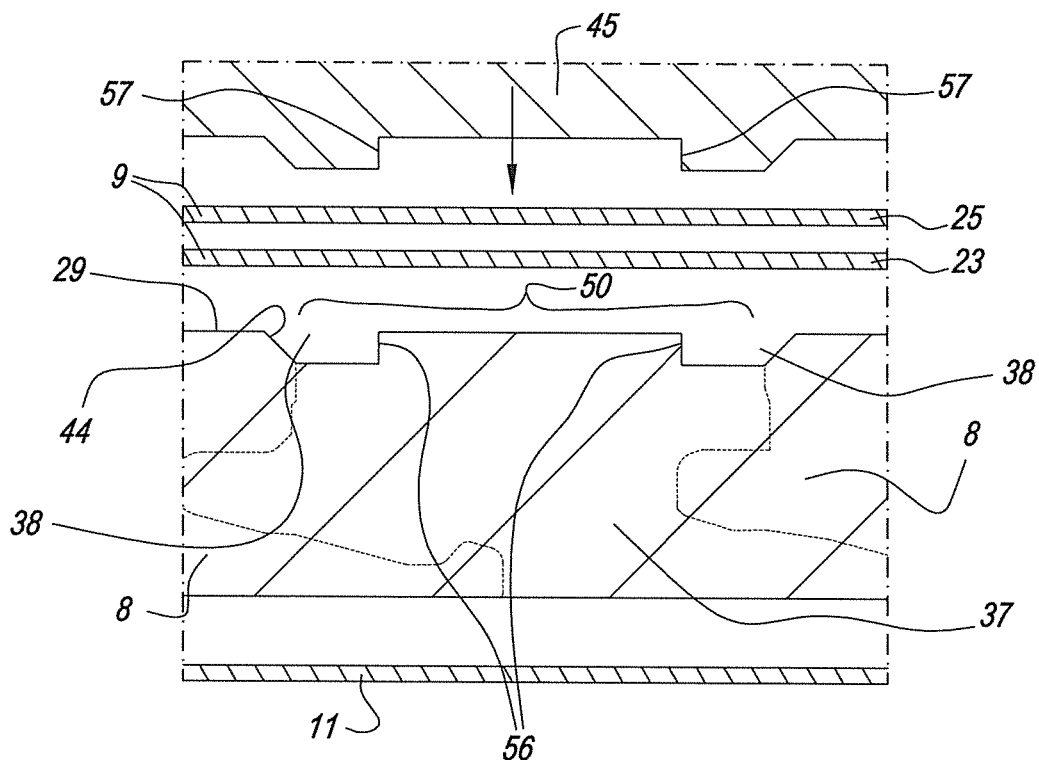
FIGS. 13 and 14, in a view similar to that of FIG. 12, represent more variants.

FIG. 13 represents an example of an embodiment according to the second practical example, mentioned in the introduction, of means for controlled tearing of one or more paper layers 23-25. Herein, the means comprise at least a pair of cooperating and substantially vertical edges 56-57 of the basic board 37. In the example, two of such pairs 56-57 are provided. In the step of pressing, the edges 56-57 engage in pairs behind each other and punch the paper layers 23-25 present in between.

Figure 14:
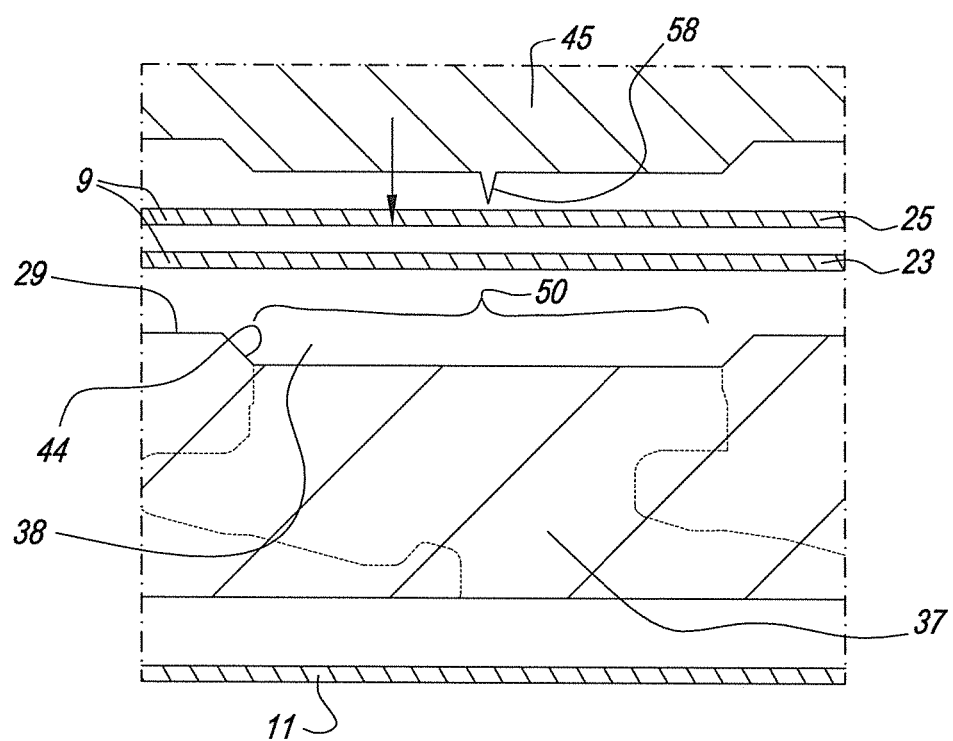

FIG. 14 represents another example of means for controlled tearing of the paper layers 23-25. In this case, a protrusion 58 is provided on the press element 45. As mentioned in the introduction, such embodiment shows the risk that the protrusion 58 becomes blunt. Possibly, protrusions 58 in the form of a replaceable insertion piece in the press element 45 can be applied, such that a complete revision of the press element 45 is redundant when the protrusion 58 is blunt.

It is also noted that, although the figures represent embodiments wherein both a first and a second pair of opposite edges are provided with lowered edge regions, it is also possible that only one pair of opposite edges is provided therewith. In such case this preferably concerns the long edges 4-5.

The present invention is in no way limited to the herein above-described embodiments, on the contrary may such floor panels and methods be realized without leaving the scope of the present invention.

The invention claimed is:

1. A method for manufacturing floor panels, wherein these floor panels comprise at least a substrate and a top layer of laminate and wherein said floor panel, at one or more edges, is provided with a lower edge region in the form of a bevel or other chamfer, wherein the method comprises at least the following steps:
   providing a basic board of the material of the substrate and of structuring an upper surface of said basic board, wherein the structure consists at least of a recess in the upper surface of the basic board at a location of said lower edge region;
   composing a stack which comprises at least the structured basic board and one or more melamine resin layers and possibly paper layers;
   pressing said stack in a heated press, wherein said melamine resin hardens and, together with the possible paper layers, forms a laminate layer adhered to the substrate, and wherein the laminate layer extends in one piece from the upper surface of the basic board up to into said recess, at least up to a point, wherein the laminate surface is situated at a level in a horizontal plane intersecting the substrate;
   subdividing the pressed whole into panels, of which said floor panels can be formed; and
   finishing the panels to form said floor panels, wherein an edge of said recess forms the lower edge region
   wherein the substrate substantially consists of an HDF board having an average density of more than 800 kilograms per cubic meter,
   wherein the HDF board forms at least an actual upper surface of the substrate and the substrate surface at the location of the lower edge region,
   wherein the laminate is formed on the basis of the melamine resin and one or more paper layers, and wherein the laminate is adhered to the substrate without any intermediate glue or resin layers, both the actual upper surface and at the location of the lower edge region.

2. The method according to claim 1, wherein one or more of the paper layers consist of paper strips situated next to each other.

3. The method according to claim 2, wherein the dividing takes place at least at the location of the edges of adjacent paper strips.

4. The method according to claim 1, wherein one or more of said paper layers extend in the stack uninterruptedly over the substrate material of at least two of the finally envisaged floor panels and the press element and/or the basic board are provided with one or more of the following configured for concentrating tears in said paper layers in the zone extending between the edges of the substrate material of the envisaged floor panels:
   a local protrusion on the upper surface of the basic board in said zone; and
   a pair of cooperating, substantially vertical walls of the basic board, the press element, respectively, which engage behind each other during the pressing step and punch the paper present in between them.

5. The method according to claim 1, wherein the laminate comprises at least a printed and resin-provided paper sheet and wear-resistant particles located above the print.

6. The method according to claim 5, wherein the printed and resin-provided paper sheet at least partially contacts the substrate.

7. The method according to claim 1, wherein the surface of the lower edge region is made sloping and this slope encloses an angle of more than 30° with the actual upper surface.

8. The method according to claim 7, wherein the sloping surface of the lower edge region extends up to the actual edge of the floor panel.

9. The method according to claim 1, wherein the level of the laminate surface slopes continuously from on the upper surface onto the lower edge region.

10. The method according to claim 1, wherein the depth to width ratio of the lower edge region is at least 0.60.

11. The method according to claim 1, wherein the floor panel comprises lower edge regions on at least two opposite edges, wherein the respective point up to which the laminate surface is extending is situated in both lower edge regions at an equal horizontal level or practically equal horizontal level wherein a possible difference in horizontal level is less than the thickness of the laminate.

12. The method according to claim 1, wherein the substrate has a density at the actual substrate surface of more than 900 kilograms per cubic meter.

* * * * *